ର2,950,336
Patented Aug. 23, 1960

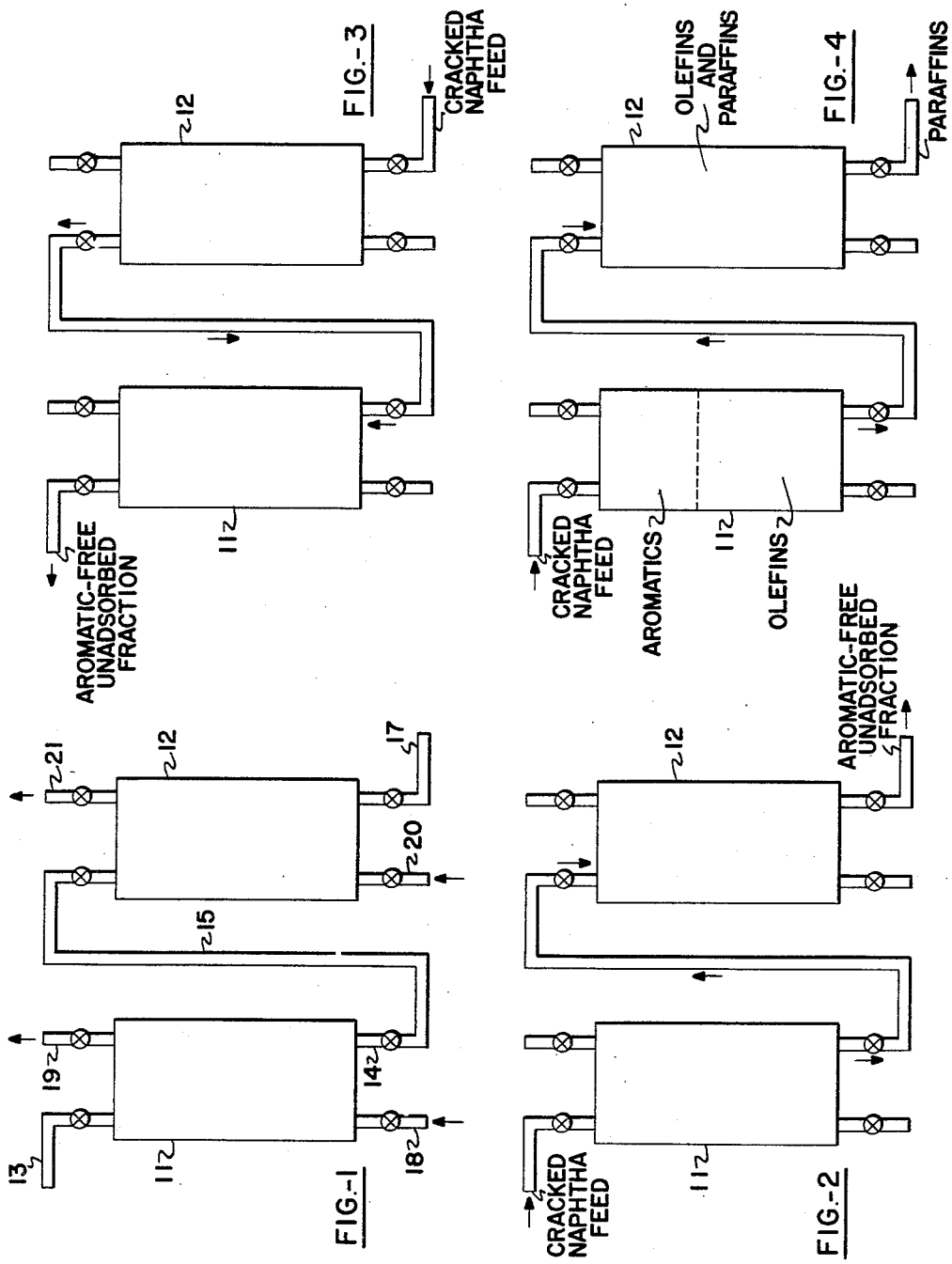

2,950,336

SEPARATION OF AROMATICS AND OLEFINS USING ZEOLITIC MOLECULAR SIEVES

Charles Newton Kimberlin, Jr., and William Judson Mattox, Baton Rouge, La., assignors to Esso Research and Engineering Company, a corporation of Delaware Filed Dec. 7, 1956, Ser. No. 626,989

4 Claims. (Cl. 260—674)

This invention relates to a process for the separation of high octane constituents such as olefins and aromatics from mixtures of the same with other hydrocarbon types such as paraffinic hydrocarbons. The invention is particularly directed to the recovery of high octane constituents from cracked naphthas, hydroformed naphthas and the like by an adsorption process employing what are known as molecular sieves.

It is known that certain natural zeolites, including analcite and chabazite, have the property of preferentially adsorbing certain types of hydrocarbons from mixtures thereof with other hydrocarbons, thus enabling the separation, for example, of normal hydrocarbons, the separation of paraffinic hydrocarbons from cyclic and aromatic hydrocarbons, and so on.

Zeolites differ from each other in chemical composition but they may be generally characterized as alkali metal or alkaline earth metal alumino-silicates. Analcite has the empirical formula

while that of chabazite is

The crystal patterns of these zeolites are such that they present structures containing a large number of pores having an exceptional uniformity of size. Only molecules that are small enough to enter the pores can be adsorbed. The pores in different zeolites may vary in diameter from less than 3 or 4 to 15 or more Angstrom units, but for any one zeolite the pores are substantially of uniform size. Because of these properties, such zeolites are known as molecular sieves. Certain synthetic zeolites also have molecular sieve properties as taught, for example, by Barrer in U.S. Patent 2,306,610 and by Black in U.S. Patent 2,442,191.

Methods for separating the various types of hydrocarbons, such as aliphatics from aromatics, straight chain from branched chain hydrocarbons and so on, from mixtures of hydrocarbons, have assumed increased importance in industry with the realization that specific structures contribute particular properties for the uses that are made of he particular hydrocarbons. Thus, for example, it is known in the petroleum industry that in the preparation of motor fuels the presence of normal paraffinic hydrocarbons leads to low octane ratings for the fuels, whereas aromatic hydrocarbons contribute to high octane ratings.

In the recovery of aromatic hydrocarbons from other types of hydrocarbons occurring in mixtures of the same by the use of molecular sieve adsorption processes, considerable quantities of non-aromatic hydrocarbons are initially adsorbed along with the aromatics. As the passage of the aromatic-containing feed through the body of molecular sieve is continued, the adsorbed non-aromatic hydrocarbons are displaced by aromatics. However, as the sieve adsorbent approaches saturation with respect to aromatic hydrocarbons, complete retention of aromatics by the sieve is not accomplished. Heretofore, in molecular sieve processes this has resulted in either the loss of aromatics because of incomplete adsorption at high aromatics concentration on the sieve or else in the desorption of an impure aromatic fraction from the sieve when operating the process for complete retention of aromatics.

It is one object of the present invention to provide a process in which high aromatic content concentrates are produced with substantially complete recovery of aromatics.

Similarly, previous attempts to separate a concentrate comprising aromatics and olefins from mixtures thereof with other hydrocarbon types by molecular sieve adsorption processes have not been entirely successful because of the fact that, as the sieve adsorbent approaches saturation with respect to aromatics and olefins, complete retention of olefins by the sieve is not accomplished. If a feed stock containing aromatics and olefins is brought into contact with a bed of molecular sieves of the 13 Angstrom type, for example, all classes of hydrocarbons are initially adsorbed. As the passage of the hydrocarbon feed through the sieve continues, aromatics tend to be retained at the feed inlet end of the adsorbent bed because the aromatics are most strongly adsorbed. The olefinic components are the next most strongly adsorbed type and thus will be retained in the sieve bed in a zone immediately downstream from the predominantly aromatic zone. However, since the olefins are less strongly adsorbed, the zone of retention for olefins will be less distinct on the downstream side of the olefin zone. Thus in previous molecular sieve processes operated for a recovery of a mixture of aromatics and olefins, there has resulted either a loss of olefins because of incomplete adsorption at high concentrations on the sieve, or else a low concentration of olefins in the fraction that is desorbed from the sieve.

It is therefore another object of the present invention to provide an improved process in which concentrates of high aromatic-olefin content can be readily obtained from such feeds as catalytic and thermal naphthas by molecular sieve adsorption.

In accordance with the present invention, a dual bed arrangement of molecular sieves is employed. A hydrocarbon feed stock containing aromatic hydrocarbons, or both aromatic hypdrocarbons and olefinic hydrocarbons, in admixture with hydrocarbons of other types, is passed through a first and then through a second of a series of at least two separate molecular sieve adsorption zones for a period of time that is at least sufficient to desorb from the first of the zones all hydrocarbons other than olefines and aromatics that were initially adsorbed in the first zone. The passage of the feed stock through the zones is then interrupted and the first zone is desorbed to recover the adsorbed hydrocarbons therefrom. The feed stock is then passed first through the second zone and then through the first zone for a period of time at least sufficient to desorb from the second zone all hydrocarbons other than olefins and aromatics that were initially adsorbed in the second zone. The passage of the feed stock through the zones is again interrupted and hydrocarbons are desorbed from the second zone. The cycle is then repeated, passing the feed stock through the first zone and then through the second zone.

If it is desired to recover a concentrate that is predominantly aromatic, the passage of feed in each phase of the cycle is continued until essentially all initially adsorbed nonaromatics have been displaced from the first zone that is being contacted with the feed in that particular phase of the cycle. If it is desired to recover a concentrate comprising a mixture of aromatics and olefins, the passage of the feed is continued until olefins begin to appear in the effluent from the second of the two zones being contacted in the particular phase of the cycle.

The nature and objects of the invention and the manner in which the invention may be practiced will be better understood when reference is made to the ensuing description and the accompanying drawings, in which:

Figure 1 is a schematic diagram of apparatus suitable for effecting the processes of the present invention;

Figure 2 is a similar diagram showing one phase of a cyclic process for recovering aromatics from a feed stock;

Figure 3 is a diagram showing a later phase of the same cyclic process; and

Figure 4 is a similar diagram showing one phase of a cyclic process for recovering a mixture of aromatics and olefins from a feed stock.

Referring to Figure 1, at least two separate towers or zones 11 or 12 are provided, each tower or zone containing a suitable molecular sieve. Molecular sieves suitable for use in this process may be of the aluminosilicate type or of the molecular template type. The molecular template adsorbents are certain organic or inorganic compositions, such as resins and gels, formed in the presence of the material which it is subsequently desired to adsorb. For instance, certain resins (polystyrene, etc.) produced in the presence of various compounds such as esters, hydrocarbons, etc. have shown high adsorption for these materials. Also, some silica gels, when formed in the presence of certain molecular species, subsequently show unusual selectivity for such species.

The preferred range of diameters for the pore openings of the molecular sieves are within the range of about 8 to 15 Angstroms. Particularly preferred are sieves having a pore diameter of 13 Angstroms.

The molecular sieve adsorbent is arranged in any desired manner in the adsorption zones 11 and 12. It may for example be arranged on trays or simply packed within the zone or tower with or without supports. In place of a fixed bed operation, other arrangements such as moving beds or fluidized beds may be employed.

The feed to be processed, for example, a catalytic naptha or a hydroformed naphtha, enters zone 11 through line 13, passes through the sieve within the zone, flows out of the zone through exit line 14 and is conducted by means of line 15 into the second zone 12, where it contacts additional sieve material before leaving the second zone through line 17. Although the sieve treatment in zones 11 and 12 may be conducted in either the liquid phase or the vapor phase, it is usually preferred to employ vapor phase treatment to ensure high rates of adsorption. Representative conditions during the treatment include temperatures of from 100 to 500° F. and feed rates of from 0.1 to 10 v./v./hr. (volumes of feed per volume of sieve per hour).

When it is desired to desorb the material in zone 11 the valves in lines 13 and 14 are closed, the valves in lines 18 and 19 are opened, and a suitable desorbing agent is passed into zone 11 through line 18 and leaves the zone through line 19. Similarly, when it is desired to desorb the material in zone 12 the valves in lines 15 and 17 are closed, the valves in lines 20 and 21 are opened, and a suitable desorbing agent is passed through the zone by means of those lines.

If it is desired to recover aromatics from the feed stock the process illustrated diagrammatically in Figures 2 and 3 is employed. The feed stock is sent through zone 11 and zone 12, zone 11 adsorbing the major portion of the aromatics and zone 12 being used for aromatics clean-up. The passage of feed is continued until essentially all initially adsorbed non-aromatics have been displaced from zone 11 with aromatics. The flow of feed is then interrupted and zone 11 is desorbed to recover the adsorbed aromatics as a product of high purity. During this desorption step zone 12 remains idle. Following the desorption step, zone 12 now becomes the main adsorption zone and zone 11 becomes the clean-up zone for the second phase of the cycle, as illustrated in Figure 3. Referring again to Figure 1 this phase of the cycle is conducted by passing the feed through line 17 into zone 12 and from zone 12 into zone 11 through line 15, the effluent from zone 11 leaving through line 13. Passage of feed in this direction is conducted until essentially all of the non-aromatics that were initially adsorbed in zone 12 have been displaced in zone 12 with aromatics. Desorption of zone 12 is then effected in the same manner as for zone 11 in the first phase of the cycle, zone 11 remaining idle during this desorption step.

It is to be understood that the operation described in connection with Figures 2 and 3 is illustrative and that the process is adaptable to many modifications. For example, at least two sets of the zones 11 and 12 will normally be employed simultaneously so that the operation can be conducted continuously, the feed being conducted through one set of the zones while desorption is being effected in one of the zones of the other set.

If it is desired to recover a mixture of aromatics and olefins, the procedure illustrated diagrammatically in Figure 4 is employed. Flow of feed stock is conducted through the zones until olefins being to appear in the effluent from zone 12. As shown in Figure 4, when this condition exists the initial portion of zone 11 will contain predominantly aromatics and the remaining portion of zone 11 will contain predominantly olefins, while zone 12 will contain olefins and paraffins. The feed is then interrupted and zone 11 is desorbed to recover the adsorbed aromatics and olefins. The rest of the cycle is conducted in a manner similar to that described in connection with Figures 2 and 3.

Desorption of aromatics and/or olefins from zone 11 or 12 may be accomplished in several ways. Preferred methods include the following: (1) purging with an unreactive gas or vapor at a temperature of about 450 to 750° F.; (2) evacuation at temperatures approximately the same as or above those employed for the adsorption; (3) displacement with an aromatic hydrocarbon having a higher or lower boiling point than that of the adsorbed material and which can subsequently be separated from the desorbate by distillation; (4) steaming followed by dehydration at relatively low temperatures.

As stated above it is particularly preferred that molecular sieves having pore diameters of about 13 Angtroms be employed in practicing this invention. Sieves of this type may be prepared by reaction of a sodium silicate having a high ratio of sodium-to-silica, e.g. sodium metasilicate with a sodium aluminate having a soda-to-alumina ratio of from 1:1 to 3:1, the proportion of sodium silicate solution to sodium aluminate solution being such that the ratio of silica-to-alumina in the final mixture is a least 3:1 and preferably from about 4:1 to about 10:1. Preferably the sodium aluminate solution is added to the sodium metasilicate solution at ambient temperatures while employing rapid and efficient agitation so as to ensure the formation of a precipitate having an essentially uniform composition throughout. The resulting homogeneous paste is heated to about 180 to 215° F. for a period as long as 200 hours or more to ensure that the crystals thereby formed will have the desired pore size of about 13 Angstroms. After the period of heat soaking, the precipitated sodium alumino-silicate is filtered and water washed and then dried and activated in a calcining zone preferably at a temperature of about 700 to 900° F.

The following example is indicative of the efficiency with which the present invention may be operated.

Example 1

A 240–349° F. catalytically cracked naphtha having a research clear octane number of 91.1 was vaporized and passed at 400° F. over a bed of alumino-silicate molecular sieves having pore openings of 13 Angstroms. The feed rate employed was 0.1 volume per hour per volume of sieve. All hydrocarbons were adsorbed until 0.09 volume of feed/volume of sieve had been fed. Aromatic-free hydrocarbons were then recovered until 0.2 volume/volume of seive had been fed. This aromatic-free material was segregated and the adsorption was continued until the effluent from the sieve column had the same aromatic content as the feed, as evidenced by refractive index measurements. This represents the stage that would be reached in the first phase of the cycle described above in connection with Figures 2 and 3, i.e. the stage when essentially all initially adsorbed non-aromatics have been displaced from zone 11 with aromatics. The feed was then discontinued and the aromatics desorbed from the sieve. The fractions of intermediate aromatic content that had passed through the sieve were then added to additional fresh feed and passed over freshly reactivated sieves in the same manner as indicated for the first pass with fresh feed until the adsorbent was saturated with aromatics. After four such cycles, there were obtained 58% of an unadsorbed, essentially aromatic-free fraction having a clear research octane number of 57.1 and 42% of an aromatic fraction having an unleaded octane number of 103.4.

It is to be understood that this invention is not to be limited to the specific embodiments thereof that are described in the foregoing specification, but that numerous variations thereof are possible without departing from the scope of the appended claims.

What is claimed is:

1. A process for selectively separating hydrocarbons selected from the group consisting of aromatic hydrocarbons and mixtures of aromatic hydrocarbons and olefinic hydrocarbons, from a hydrocarbon feedstock including said hydrocarbons in admixture with other hydrocarbons, which comprises: passing said feedstock in the vapor phase into one end of a first, and then through one end of a second, of a series of two separate molecular sieve adsorption zones for a period of time at least sufficient to desorb from said first zone all hydrocarbons other than olefins and aromatics initially adsorbed in said first zone, discontinuing the passing of said feedstock through said zones, desorbing and recovering the adsorbed hydrocarbon from said first zone, passing said feedstock in series through the other end of said second and then through the other end of said first of said zones for a period of time at least sufficient to desorb from said second zone all hydrocarbons other than olefins and aromatics adsorbed in said second zone, discontinuing the flow of said feedstock to said zones, and desorbing and recovering the adsobred hydrocarbons from said second zone.

2. Process as defined by claim 1 wherein said adsorption zones contain molecular sieves having pore sizes in the range of from about 8 to 15 Angstroms.

3. Process as defined by claim 1 wherein said adsorption zones contain molecular sieves having pore sizes of about 13 Angstroms.

4. A process for selectively separating aromatic hydrocarbons from a hydrocarbon feedstock comprising said hydrocarbons in admixture with other hydrocarbons, which comprises: passing said feed stock in the vapor phase through one end of a first, and then through one end of a second, of a series of at least two separate molecular sieve adsorption zones for a period of time at least until all initially adsorbed non-aromatics have been displaced from said first zone by aromatic hydrocarbons, discontinuing the passing of said feedstock through said zones, desorbing and reovering the adsorbed aromatic hydrocarbons from said first zone, passing said feedstock in series through the other end of said second zone and then through the other end of said first zone at least until all initially adsorbed non-aromatics have been displaced from said second zone by aromatic hydrocarbons, discontinuing the passing of said feedstock through said zones, and desorbing and recovering aromatic hydrocarbons from said second zone.

References Cited in the file of this patent

UNITED STATES PATENTS

| | | |
|---|---|---|
| 2,599,545 | Egan et al. | June 10, 1952 |
| 2,754,344 | Weatherly | July 10, 1956 |
| 2,834,429 | Kinsella et al. | May 13, 1958 |

OTHER REFERENCES

"Molecular Sieves," publication of the Linde Company, Aug. 19, 1957.